Oct. 30, 1928.
J. H. WAGENHORST
1,689,650
AUTOMOBILE WHEEL
Filed July 6, 1925
3 Sheets-Sheet 1
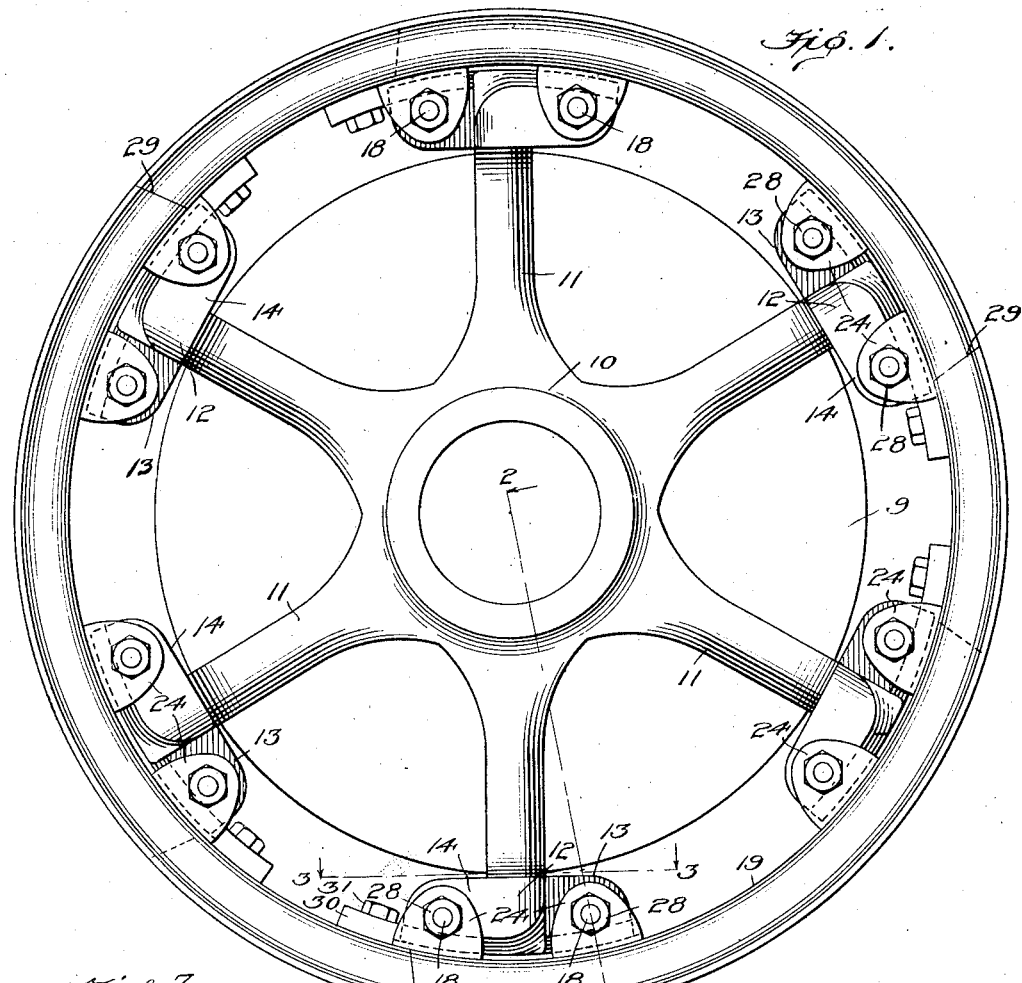
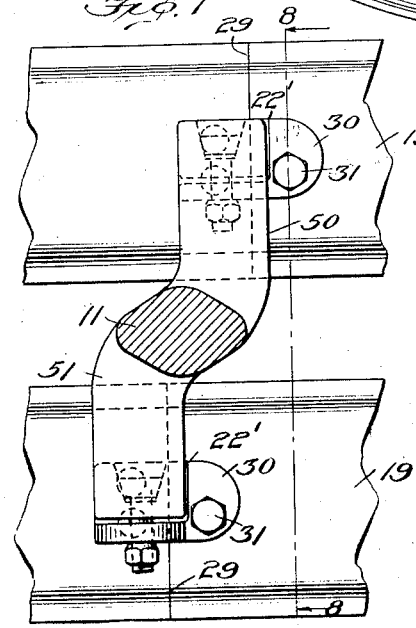
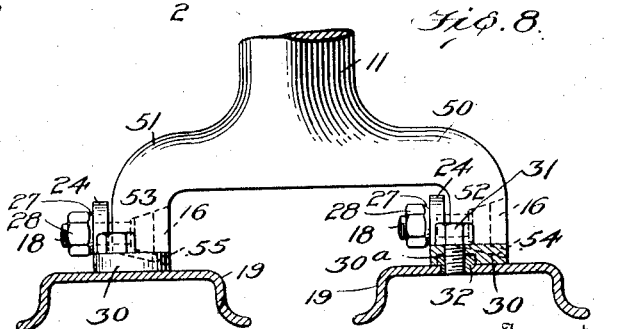
Inventor
James H. Wagenhorst
By Church & Church
Attorneys Oct. 30, 1928.

J. H. WAGENHORST 1,689,650

AUTOMOBILE WHEEL

Filed July 6, 1925

Inventor
James H. Wagenhorst
By Church & Church
Attorneys

Oct. 30, 1928.
J. H. WAGENHORST
1,689,650
AUTOMOBILE WHEEL
Filed July 6, 1925
3 Sheets-Sheet 3
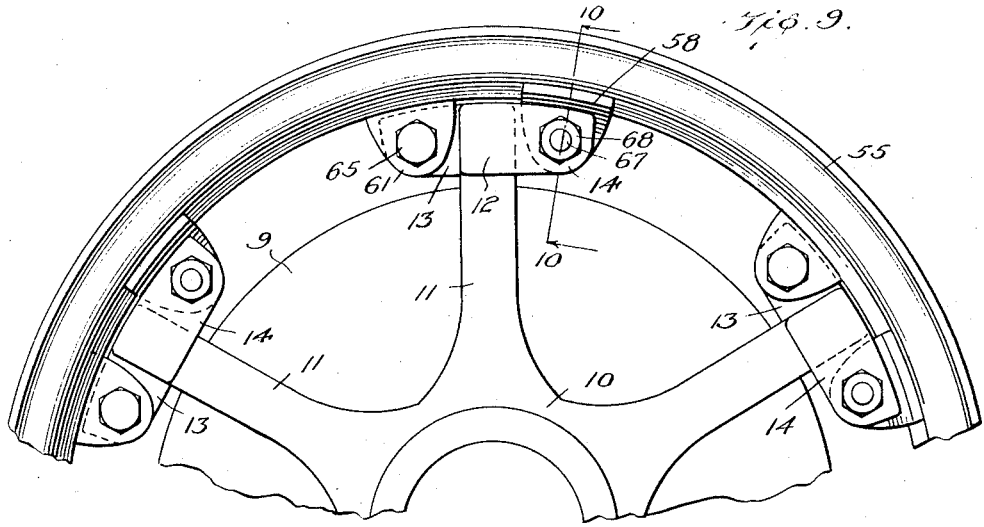
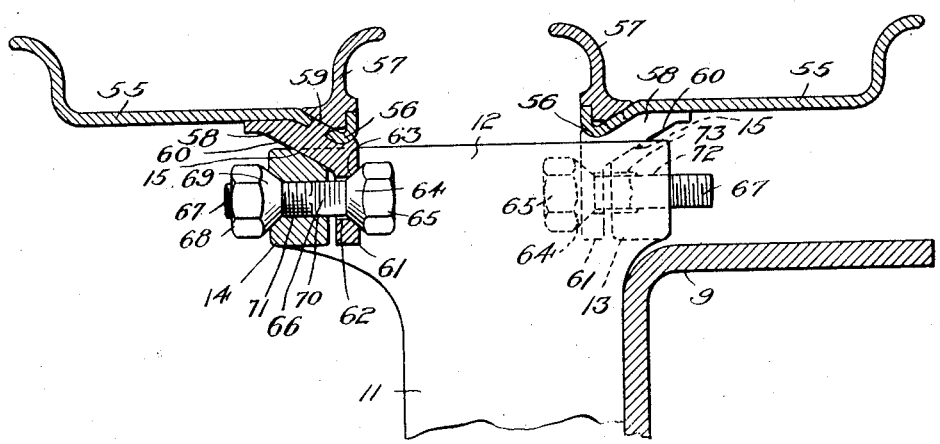
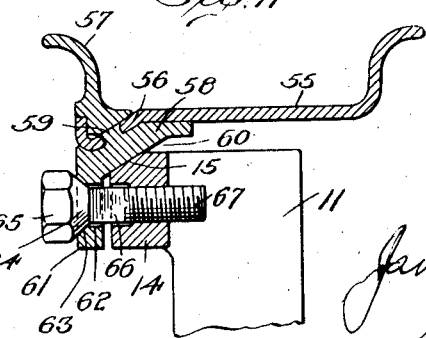
Inventor
James H. Wagenhorst
By Church & Church
Attorneys Patented Oct. 30, 1928.

1,689,650

UNITED STATES PATENT OFFICE.

JAMES H. WAGENHORST, OF JACKSON, MICHIGAN.

AUTOMOBILE WHEEL.

Application filed July 6, 1925. Serial No. 41,834.

My invention relates to certain new and useful improvements in automobile wheels and has to do, more particularly, with the construction of automobile wheels having dual demountable rims and tires and the mounting of such demountable rims in dual arrangement on a wheel.

It has become a common practice, particularly in connection with motor trucks or buses designed for heavy loads, to provide the rear wheels with dual tires. The chief object of my present invention is to provide an improved wheel construction embodying a pair of demountable rims, adapted to carry a pair of resilient tires, mounted in dual arrangement on the body of the wheel. It is an object of my invention to provide an improved mounting by which demountable rims may be detachably secured on the body of the wheels. A further object of my invention is to provide a mounting for dual demountable rims on a wheel body such that the rims may be mounted singly on a front wheel, for instance, the same demountable rim being capable of use interchangeably, in dual arrangement on rear wheels, and singly on front wheels.

A further object of my invention is to provide a mounting for dual demountable rims which is simple and economical to manufacture and renders it easy to mount and detach the rims.

A further object of my invention is to provide a wheel construction and a mounting for dual demountable rims which are particularly well adapted to the use of demountable rims of the attached lug type.

Another object of my present invention is to provide an improved rim construction which is particularly suited for use in dual arrangement with large size tires such as are commonly used for motor trucks or buses.

Further objects, and objects relating to details and economies of construction and operation, will definitely appear from the detailed description to follow. In one instance, I accomplish the objects of my invention by the devices and means set forth in the following specification. My invention is clearly defined and pointed out in the appended claims. A preferred embodiment of my invention is illustrated in the accompanying drawings, forming a part of this specification, in which:

Fig. 1 is a view, in front elevation, of a wheel embodying my invention;

Fig. 7 is a view similar to Figs. 3, 4 and 5, but showing another modification in the construction of the wheel;

Fig. 8 is a view of this modified construction, taken on line 8—8 of Fig. 7;

Fig. 9 is a fragmentary view, in front elevation, of a wheel embodying my invention in connection with demountable rims having detachable side flanges;

Fig. 10 is a sectional view taken on the line 10—10 of Fig. 9; and

Fig. 11 is a corresponding view showing the mounting of either of the demountable rims of Fig. 10, singly, on a front wheel.

In the drawings, the same reference numerals refer to the same parts throughout the several views, and the sectional views are taken looking in the direction of the arrows at the ends of the section lines.

In general, my invention consists in providing the periphery of the wheel body with two sets of rim-seating surfaces and the rims with co-operating surfaces. There is one set of these rim-seating surfaces for each demountable rim and the two sets are arranged so as to support a pair of rims in dual or parallel arrangement on the wheel body. I propose to stagger the rim-seating surfaces of the front set with respect to the rim-seating surfaces of the rear set so that the surfaces of the front set are not in the way of and do not interfere with the removal of the rear rim. I also propose to provide two sets of rim-securing bolts carried by the periphery of the wheel body, arranged in a front and a rear set for securing two rims in dual arrangement on the wheel body, the bolts of the front set being staggered with respect to the bolts of the rear set so as not to interfere with the removal of the rear rim. I propose to use demountable rims having attached lugs and to provide such attached lugs with portions engaging the rim-seating surfaces of the wheel body and forming the surfaces of the wheel body with such rim-seating surfaces. The attached lugs co-operate with the rim-securing bolts to hold the rims in position on the wheel body. As one means of carrying out my invention, I propose to form the staggered rim-seating surfaces on the outer ends of the spokes forming the wheel body.

Another feature of my invention contemplates a demountable rim comprising three or more arcuate sections connected by combined connecting plates and attached lugs which are so formed as to engage the rim-seating surfaces of the wheel body.

Figure 2:
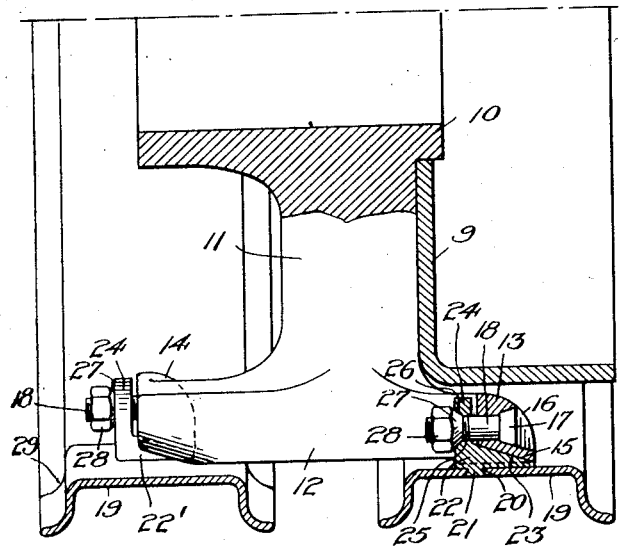
Fig. 2 is a sectional view of the wheel, taken on the line 2—2 of Fig. 1.
Figure 3:
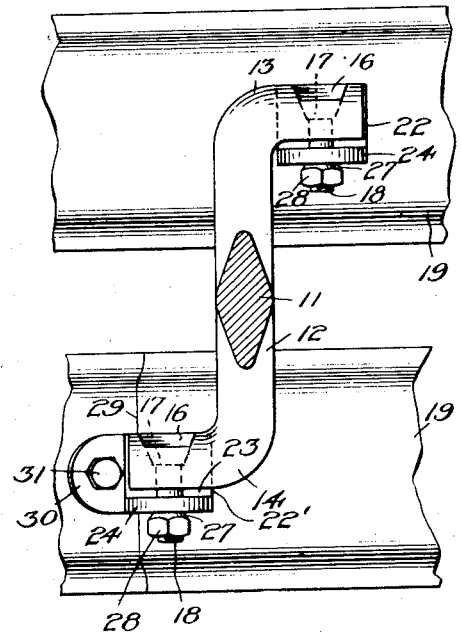
Fig. 3 is a detail, sectional view, taken on the line 3—3 of Fig. 1.
Figure 6:
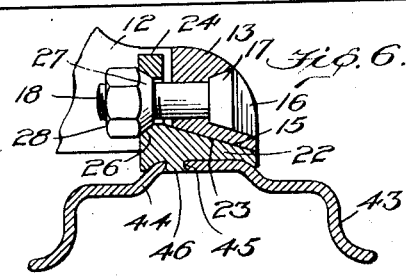
Fig. 6 is a fragmentary, sectional view, corresponding to a part of Fig. 2, but showing a rim having a drop-base portion.

Referring to the numbered parts of the drawings, I have illustrated, in Figs. 1, 2 and 3, a wheel having a wheel body made up of the hub, 10, and the radiating spokes, 11. At the outer end of each spoke, there is an integral cross-arm, 12, and the end portions, 13 and 14, of these cross-arms are turned in opposite directions, as shown in Fig. 3. Each of these oppositely-turned end portions has an inclined rim-seating surface, 15, formed thereon, said surfaces tapering outwardly toward the rear of the wheel. Each of these oppositely-turned end portions, 13 and 14, has a recess, 16, formed therein, opening toward the rear of the wheel, and a bolt hole communicating with the recess and in line with the corresponding tapered surface, 15. The rim-securing bolts, 18, are inserted in these bolt holes with their heads, 17, lodged in the recesses, 16, and such heads and recesses are preferably so formed as to prevent the bolts from turning in the bolt holes. The demountable rims, 19, have a series of securing lugs attached thereto. In the construction shown, openings, 20, are formed in the base of the rim and studs, 21, projecting from the attached lugs, 22, are inserted through such openings and riveted over, whereby the lugs are rigidly attached to the rim. Each of these attached lugs, 22, has an inner tapered surface, 23, adapted to seat on one of the rim-seating surfaces, 15, of the whole body. Each attached lug, 22, also has an inwardly-extending portion, 24, having a transverse bolt hole, 25, therein with a conical recess, 26, at its front end. The demountable rims, 19, are mounted on the wheel body with the surfaces, 23, of lugs, 22, seated on surfaces, 15, of the wheel body and with the rim-securing bolts, 18, projecting through the bolt holes, 25. The nuts, 28, screwed on the front ends of said bolts have conical shoulders, 27, engaging the conical recesses, 26, of the attached lugs, and hold the rims seated in dual arrangement on the periphery of the wheel body. The diameter of the bolt hole, 25, should be somewhat greater than the diameter of the bolt, 18, as indicated in Fig. 6, so as to provide ample clearance to render the removal of the rim easy when the nuts, 28, are removed. A brake-drum, 9, is shown attached to the body of the wheel in the usual manner.

This construction is simple and easily manufactured and provides for mounting the rims in dual arrangement, so that they can be readily demounted. The front rim is quite readily accessible, so that it can be conveniently removed. When the front rim has been removed, the operator can easily get at the nuts, 28, which hold the rear rim in place, so as to apply a wrench thereto and unscrew them. When these nuts are removed, the rear rim can be removed at once and it will be noticed that none of the parts provided for seating the front rim, or securing it in position, are so located as to interfere with the removal of the rear rim. In mounting the rims, 19, on the wheel body, the rear rim is first passed axially over the periphery of the wheel body until the surfaces, 23, of the attached lugs engage and seat upon the tapered surfaces, 15, on the rear ends of the cross-arms, 12, and the bolts, 18, carried by the rear ends of the cross-arms pass through the bolt holes, 25. The nuts, 28, are then screwed upon the bolts and the rear rim is held mounted on the wheel body. The front rim is passed over the periphery of the wheel body until the surfaces, 23, of the attached lugs, engage and seat upon the tapered surfaces, 15, at the front ends of the cross-arms, 12, and the bolts, 18, extend through the bolt holes, 25. The nuts, 28, are then screwed up and the front rim is held mounted on the wheel body in proper parallel arrangement with respect to the rear rim. The same rims, 19, may be used singly on a front wheel, the periphery of the body of such front wheel being provided with rim-seating surfaces, 15, and bolts, 18, arranged so that the rim will be supported in proper relation to the plane of the wheel.

The rims, 19, are shown as being each made up of three arcuate sections, the joints between such sections being indicated at 29. Certain of the attached lugs, 22', also serve as connecting members to connect adjacent sections to form the complete demountable rim. The attached lugs which are to act as connecting plates or members, each have a portion, 30, bridging the joint between adjacent sections of the rim and engaging the inner face of the base of the adjacent section. A bolt, 31, passing through the portion, 30, screws into an eyelet, 32, attached to the adjacent section of the rim, as shown in Fig. 8, and said eyelet may also be lodged in a suitable recess, 30ª, formed in the portion, 30. This rim construction is well adapted for this use on motor truck wheels, in dual arrangement. With tires and rims of the size usually used on such wheels, and with the rims split at one point only, the rims are so stiff that it is difficult for the operator, with ordinary tools, to collapse the rim sufficiently to remove the pneumatic tire. With my construction, the removal of the bolts, 31, permits the operator to collapse the rim very easily when he has to remove a tire. When the rims are mounted on the wheel body, each rim section is supported at two points, at one end and in the middle, and the other end of the rim section is directly connected to an attached lug which is directly supported by the wheel body. This provides a very strong wheel construction while permitting the rims to be collapsed with ease when necessary.

Figure 4:
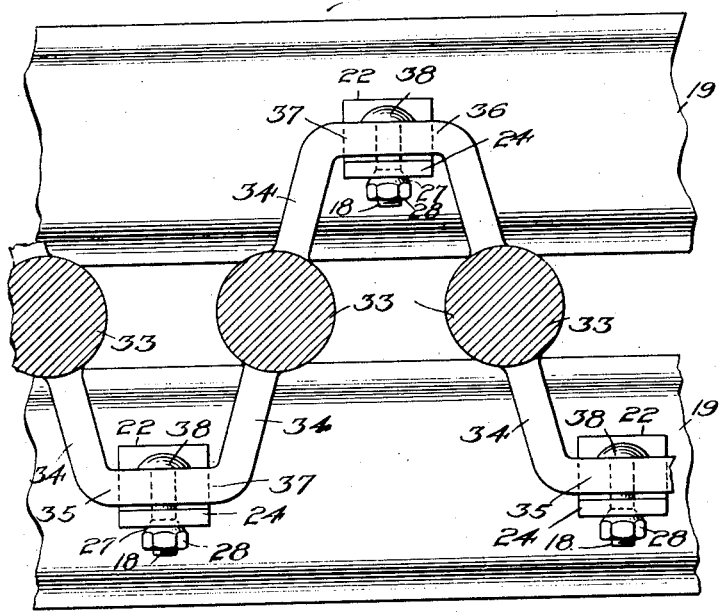
Fig. 4 is a view similar to Fig. 3, but showing a modified form of wheel.

In Fig. 4, I have illustrated a modified wheel construction embodying the same principles as the construction of Figs. 1, 2 and 3. In this modification, there is an undulatory felloe member, 34, formed integral with the outer ends of the spokes, 33. This undulatory felloe member, 34, has portions, 35 and 36, extending parallel to a circle having its center on the axis of the wheel. The portions, 35, alternate with the portions, 36, and the former are in front of the plane of the spokes, 33, while the latter are in rear of such plane. The portions, 35, and 36, are provided with inclined rim-seating surfaces, 37, tapering outwardly to the rear of the wheel, and the rim-securing bolts, 18, extend through these portions in line with the surfaces, 37, the heads, 38, of such bolts engaging the rear faces of the portions, 35 and 36. Any suitable expedient may be provided to prevent the bolts, 18, from turning. The same demountable rims, 19, described with reference to Figs. 1, 2 and 3, may be used with the construction of Fig. 4. The surfaces, 23, of the attached lugs, 22, engage and seat upon the rim-seating surfaces, 37, and the rims are held in place by the nuts, 28, screwed on the ends of bolts, 18, and having conical shoulders, 27, engaging conical recesses in the inwardly extending portions, 24, of the attached lugs.

Figure 5:
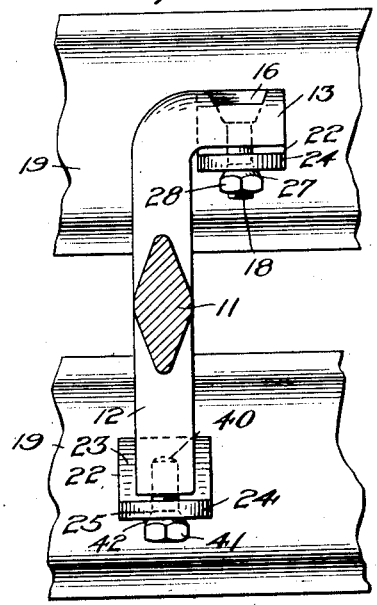
Fig. 5 is a view similar to Figs. 3 and 4, but showing another modification in the construction of the wheel.

In Fig. 5, I have illustrated a modified construction in which only the rear ends of the cross-arms, 12, are turned laterally to form the portion, 13. This portion, 13, has the rim-seating surface, 15, and carries the rim-securing bolt, 18, as shown in Fig. 2. The front end of the cross-arm, 12, has a tapered rim-seating surface, 15, formed thereon, and is provided with a threaded socket 40 in line with said surface. The rims, 19, described with reference to Figs. 1, 2 and 3, may be used with this modified construction. The rear rim is mounted in the manner already described. The front rim is passed over the periphery of the wheel body until the surfaces, 23, of the attached lugs engage and seat upon the rim-seating surfaces, 15, at the front ends of the cross-arms, 12. Bolts, 41, are inserted through the bolt holes, 25, of the attached lugs and screwed into the sockets, 40, until the conical shoulders, 42, on the heads of the bolts engage the conical recesses, 26, of the attached lugs. This holds the front rim seated on the wheel body.

In Fig. 6, I have illustrated a slight modification in which the demountable rim 43 is provided with a central drop-base portion 44 having an opening 45 therein through which the stud 46 on the securing lug 22 extends. This stud is riveted over against the outer face of the drop-base portion of the rim, thereby rigidly attaching the securing lug to the rim. The lug 22 has a tapered surface 23 adapted to seat on a tapered rim-seating surface 15 on the end of the arm 13 and may be secured thereto by bolts 18 and nuts 28, as illustrated in Fig. 2. This central drop-base portion strengthens the rim considerably and also affords more clearance between the rim-seating arms and the body portion of the rim.

In Figs. 7 and 8, I have shown another modification of my invention in which the spokes 11 of the wheel body have the laterally extending arms 50 and 51 which are slightly offset or staggered with respect to each other, as shown in Fig. 7. The ends of these arms are provided with outwardly extending portions 52 and 53, terminating in tapered rim-seating surfaces 54 and 55. The demountable rims 19 have the securing lugs 22 attached thereto and provided with tapered surfaces seating on the rim-seating surfaces 54 and 55. The bolts 18, having the heads 17 fitting in the recesses 16 of the arms 52 and 53, extend through the bolt-holes in the portions 24 of the securing lugs and the rims are detachably retained in seating relation upon these rim-seating surfaces by the nuts 28 screwed on the ends of the bolts 18 and having conical portions 27 engaging the countersunk surfaces at the front ends of the bolt holes. The rims 19 may be split in three segments, as shown in Fig. 1, and the lugs secured to the rim adjacent the splits preferably have the integral portion 30 which bridges the split and receives the stud 31 screwed into an eyelet 32 fastened to the opposite portion of the rim.

With this modification, there is sufficient room to enable the operator to get at the nuts 28 which screw on the bolts 18 to remove them, and the rear demountable rim may be easily removed from the rim seating surfaces 54 by moving it forwardly until the inwardly extending portions 24 of the lugs clear the bolts and then, if necessary, giving a slight rotation to the rim so that it will clear the front rim seating surfaces.

In Figs. 9 and 10, I have shown a modified form of my invention which is particularly adapted for use with demountable rims having detachable side flanges. The wheel body 10 has a plurality of radiating spokes 11, the ends of said spokes being provided with cross-arms 12 having oppositely turned portions 13 and 14. The portion 13 is at the rear of the wheel and provided with a tapered or inclined surface 15 which tapers outwardly toward the rear of the wheel. The demountable rim 55 has a gutter 56 formed therein and adapted to receive a detachable side flange 57. The securing lugs 58 are rigidly connected to the rim by studs 59 projecting through openings formed in the gutter 56 and riveted over. Each securing lug has a tapered inclined portion 60 adapted to seat on the tapered rim seating surface 15 and a portion 61 extending radially inward in front of the arm 14. This portion 61 has a bolt hole 62, one end of which is countersunk as at 63. The arms 14 which support the rear rim each have the tapped holes 72 having an entrance portion 73 of larger diameter. The rear rim is held in seating position upon the arms 14 by means of the bolts 67 which extend through the bolt holes 62 and the entrance portions 73 and are screwed into the tapped holes 72. A portion of the bolt 67 is squared as at 66, so that this same bolt may be used in fastening the front rim in place, and this squared portion fits into the enlarged entrance portion 73 of the tapped hole which is of sufficient diameter so that the squared part may rotate therein. The conical shoulder 64 on the head 65 of the bolt is adapted to engage the countersunk conical recess formed in the portion 61 of the securing lug when the bolt is screwed home.

The front rim has a plurality of similar securing lugs attached to the gutter 56 and the front arm 14 has a tapered rim seating surface 15 tapering outwardly toward the front of the wheel. In mounting the front rim in place, it is reversed in position with respect to the rear rim so that the detachable side flanges 57 of the two rims are adjacent each other. The portions 61 of the securing lugs on the front rim extend radially inward in rear of the arms 14 at the front of the crossarm 12. The bolts 67 are inserted from the rear into the squared opening 71 formed in the front arm 13, until the conical shoulder 64 on the head of each bolt 67 engages the conical recess 63 of the securing lug and the squared portion 70 of the bolt engages in the squared hole 71 in the arm 14 so as to prevent the bolt from turning. Nuts 68 having conical shoulders 69 are then screwed upon the ends of the bolt 67 and the conical shoulders 69 engage the conical recesses formed in the arms 14 at the front ends of the holes 71.

The front rim may be easily demounted by unscrewing the nuts 68, removing the bolts 67, and then rotating the rim slightly until the portions 61 of the lugs clear the ends of the arms 14. The rim can then be removed by moving it forwardly. After the front rim has been removed, all that the operator needs to do to remove the rear rim is to unscrew the bolts 65 and then move the rear rim forwardly, there being nothing in the path of the portions 61 of the securing lugs or any other part of the rear rim to interfere with this removal.

In Fig. 11, I have shown a view of a front wheel showing how either one of the rims, shown in Fig. 10 mounted on a rear wheel, may be mounted in single arrangement when it is to be used on the front wheel. In use on a front wheel, the spokes 11 are provided with arms 14 having rim seating surfaces 15 and the rims are secured in place by means of the bolts 67 in substantially the same way that the rearmost of the two rims is held in place in Fig. 10. It will appear, therefore, that these parts are interchangeable between the front and rear wheels and that either of the two demountable rims used on the rear wheels may be interchanged with the single rim used on the front wheels.

I am aware that the particular constructions illustrated and described herein may be changed in a number of particulars without departing from the spirit of my invention and, therefore, I claim my invention broadly, as indicated by the appended claims.

Having thus described my invention, what I claim as new and useful and desire to secure by Letters Patent is:—

1. In a wheel, a cast metal wheel body comprising a plurality of spokes having cross-arms at the outer ends thereof, said cross-arms being provided with rim-seating surfaces arranged in two sets, one in front of and the other in rear of the central plane of the wheel, the surfaces of one set being staggered with respect to the surfaces of the other set.

2. In a wheel, a cast metal wheel body comprising a plurality of spokes having cross-arms at their outer ends, each of said cross-arms having a pair of rim-seating surfaces staggered with respect to each other and arranged on opposite sides of the central plane of the spokes, two sets of rim-securing bolts carried by said cross-arms on opposite sides of said central plane and staggered with respect to each other, and a pair of demountable rims mounted in parallel arrangement on said rim-seating surfaces and held thereon by said securing bolts.

3. In a wheel, a wheel body comprising a plurality of spokes having cross-arms at their outer ends and oppositely-directed rim-seating arms at the ends of said cross-arms, said rim-seating arms being provided with rim-seating surfaces tapering outwardly toward the rear of the wheel, securing bolts carried by said rim-seating arms in line with said surfaces, a pair of demountable rims having securing lugs rigidly attached thereto, said lugs seating on the rim-seating surfaces and said bolts extending through bolt holes in said lugs, and nuts screwed on said bolts and engaging said lugs.

4. In a wheel, the combination of a wheel body comprising a plurality of spokes having cross-arms on the outer ends thereof, each cross-arm having a laterally extending arm at the rear end thereof, a set of tapered rim seats formed on said laterally extending arms, another set of rim seats formed on the front ends of said cross-arms, a plurality of securing bolts carried by said arms in line with said rim seats, a pair of demountable rims having a plurality of securing lugs rigidly attached thereto, said lugs seating on said rim seats and said bolts extending through bolt holes in the lugs, and nuts screwed on said bolts and engaging said lugs.

5. In a wheel, a cast metal wheel body comprising a plurality of spokes having cross-arms at their outer ends, rim-seating surfaces formed at the opposite ends of said cross-arms and tapering outwardly toward the rear of the wheel, securing bolts carried by opposite ends of said cross-arms in line with said rim-seating surfaces, a pair of demountable rims having securing lugs rigidly attached thereto, said lugs seating on the rim-seating surfaces and said bolts extending through bolt holes in said lugs, and nuts screwed on said bolts and engaging said lugs.

JAMES H. WAGENHORST.